Oct. 13, 1925.
J. WIEHN
SNAP FASTENER
Filed March 3, 1925
1,557,125
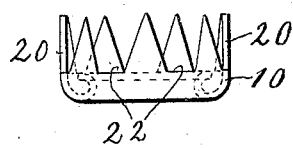
Fig. 1.
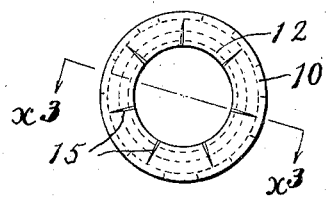
Fig. 2.
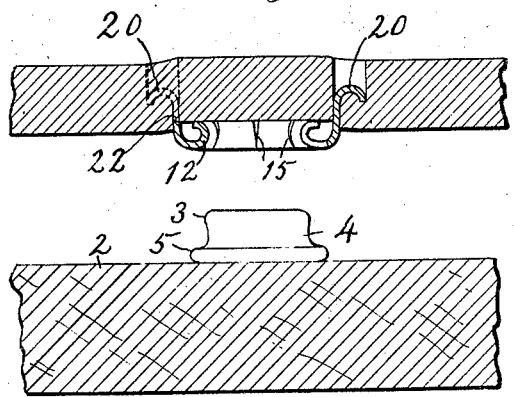
Fig. 3.
Fig. 4.
Inventor
Jacob Wiehn
by Jos. P. Livermore
Attorney Patented Oct. 13, 1925.

1,557,125

UNITED STATES PATENT OFFICE.

JACOB WIEHN, OF DORCHESTER, MASSACHUSETTS, ASSIGNOR TO UNITED STATES FASTENER COMPANY, A CORPORATION OF MAINE.

SNAP FASTENER.

Application filed March 3, 1925. Serial No. 12,918.

*To all whom it may concern:*

Be it known that I, JACOB WIEHN, a citizen of the United States, and resident of Dorchester, in the county of Suffolk and State of Massachusetts, have invented an Improvement in Snap Fasteners, of which the following description, in connection with the accompanying drawing, is a specification, like reference characters on the drawing designating like parts.

This invention relates to the socket member of a stud and socket fastener of the kind in which the stud, having an enlarged head, is secured to a part to which a carpet or something of that nature is to be detachably fastened by engagement of the socket member secured thereto with the said stud member.

While not limited to that use the fastener herein shown is adapted and desirable for use in connection with carpets or rugs to be detachably held in place on the floor by the stud member of the fastener which is secured to the floor, and the socket member which is secured to the carpet or fabric.

The socket member forming the subject of this invention is extremely simple and inexpensive, but is of exceptional effectiveness and durability.

Fig. 1 is a side elevation of a socket member or fastener embodying this invention, as it appears before attachment to the fabric with which the fastener is used.

Fig. 2 a plan view as seen looking toward the socket entrance for the stud.

Fig. 3 a sectional view showing the socket member secured to the fabric and separated from the stud member; and,—

Fig. 4 is a side elevation of the stud member secured to the floor or part to which the fabric and socket member shown in Fig. 3 are to be detachably fastened.

Referring to Fig. 4, the stud member may be of any usual construction, being adapted to be secured to the floor, 2, or other support or material in connection with which fastener is to be used, and said stud having a head, or slight enlargement, 3, at its outer end, or, to refer to the same feature in different language, having a slightly contracted neck, 4, between its base or supporting part, 5, and the head, 3, which is to enter the socket.

The socket member is composed of a single unitary ring or annulus of metal, 10, which might be regarded as a short tube, having one end curved inward and upward as best shown at 12 in Fig. 3, and having the said inwardly and upwardly curved portion divided by radial slits, 15, into a number of separate wings or fingers which are thus free to yield slightly for the resilient expansion and contraction of the mouth of the socket, which is within the said fingers.

At the other edge of the ring or short tube there are provided a number of prongs, 20, which normally lie in a cylindrical surface, or extend in a general direction parallel to the axis of the socket member. Said prongs are sharp pointed, but broaden toward the base or junction with the continuous portion of the ring or tube.

Spaces, 22, are left between the prongs, 20, which spaces are as shown about equal in length to the width of the bases of the projections, and the slits, 15, which divide the rounded internal lip, 12, around the mouth of the socket into separate spring wings or fingers are located in line with the metal of the fastening prongs, 20, so that they do not substantially weaken the ring or annulus, as the prongs would prevent the ring from being torn apart in line with one of the slits, 15, as might more easily occur if said slits were located opposite the spaces, 22, between the prongs and thus more nearly severed the ring.

In applying the socket to the fabric the prongs are forced up through the fabric and are then turned or curled, preferably outward, as shown in Fig. 3, thus clinching the socket to the fabric and preventing the latter from pulling away from the socket in the operation of detaching the socket from the stud in the customary use of the fastener.

The spaces, 22, between the prongs afford a suitable bearing for the socket piece against the lower face of the fabric and insure that the socket member is properly forced down over the stud member when pressure is applied to the fabric above it.

Sockets of the kind herein described are commonly used with carpets or piled fabric in connection with which the prongs, 20, penetrate the woven portion of the fabric and for the most part crowd the threads apart without cutting or breaking them, and when said prongs are bent down or clinched upon the woven portion of the fabric they are practically embedded in and concealed by the pile of the fabric so that the fastener is practically invisible when the carpet is fastened in place thereby.

The inwardly and upwardly curved portion, 12, preferably terminates in an outwardly turned margin approximately in the plane of the spaces, 22, between the prongs, thus affording a complete annular bearing against the lower surface of the fabric, additional to that afforded by the edges of the ring in said spaces, 22, and the inwardly curved portion affords a transversely convex annular lip entirely around the resilient mouth, which thus slips smoothly on to and off from the stud head when proper force is applied, although it holds securely when the lip springs back around the neck, 4, of the stud after it has been expanded in being forced over the head, 3, of the stud.

I claim—

1. A socket member for a snap fastener composed of a short tube having one end curved inward to form a transversely convex internal lip, said lip having radial slits forming separate spring wings, the other end of the said tube being provided with a number of attaching prongs parallel to the axis of the tube and having substantial spaces between them at their junction with the unpronged portion of the tube, the radial slits of the internal lip being in line with the attaching prongs.

2. A socket member of a snap fastener, as specified in claim 1, in which the inner edge of the inturned lip is substantially in the plane with the bottoms of the spaces between the attaching prongs.

JACOB WIEHN.